Figure 1:
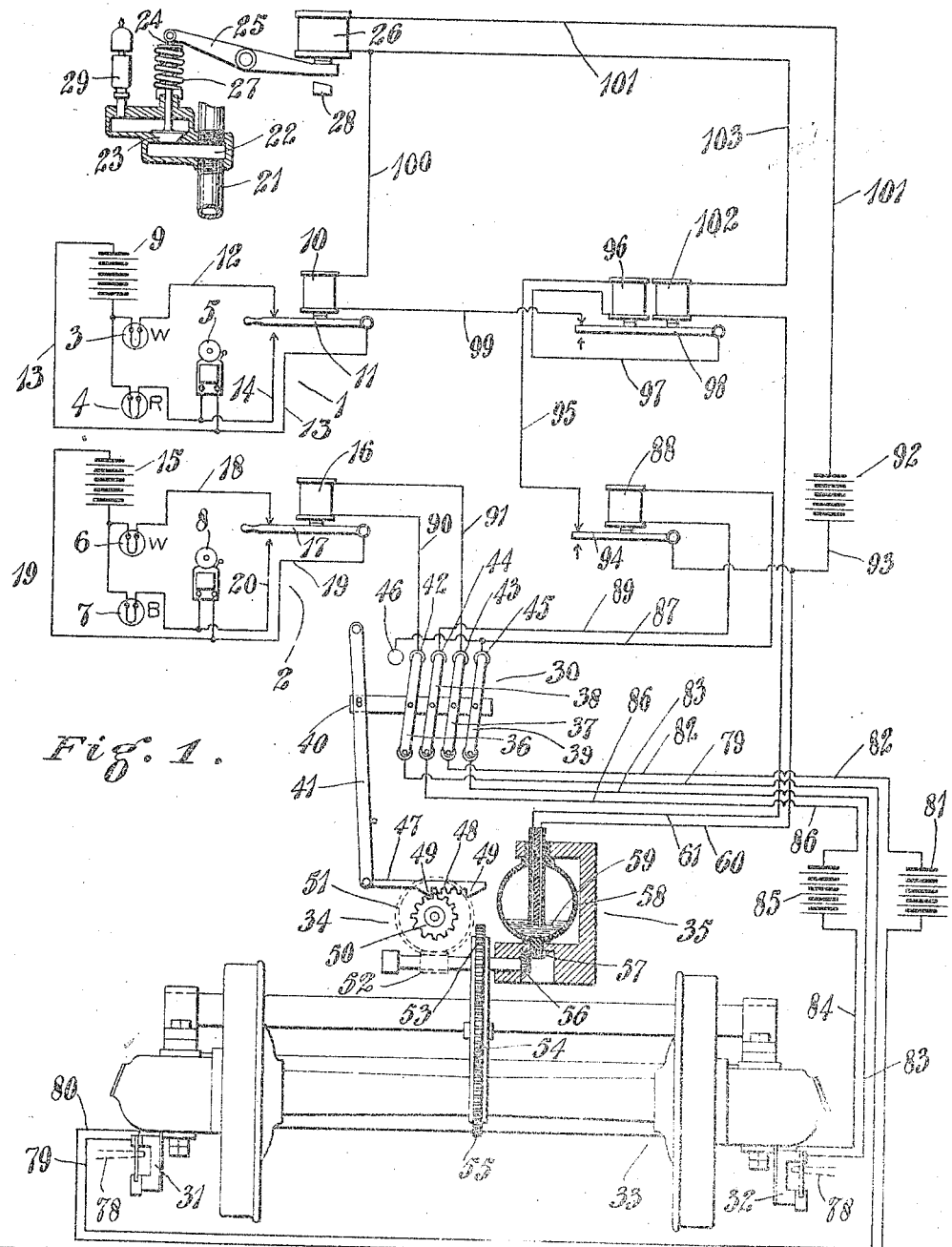

C. F. RUMOLD.
RAILWAY SIGNAL AND CONTROL APPARATUS.
APPLICATION FILED AUG. 12, 1913.

1,137,089.

Patented Apr. 27, 1915.
4 SHEETS—SHEET 1.

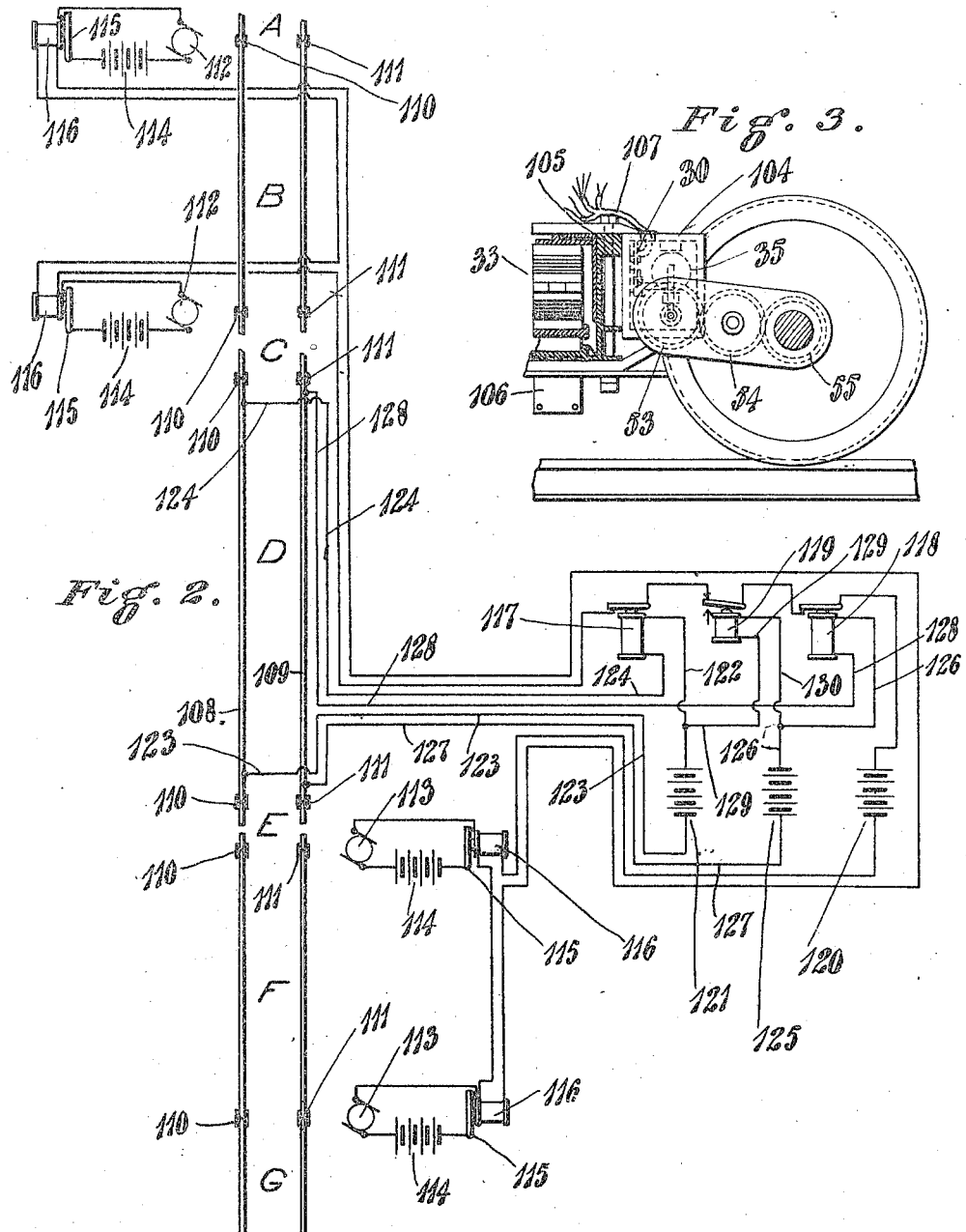

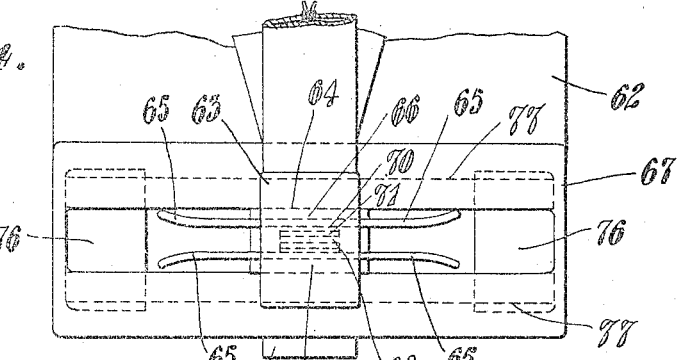

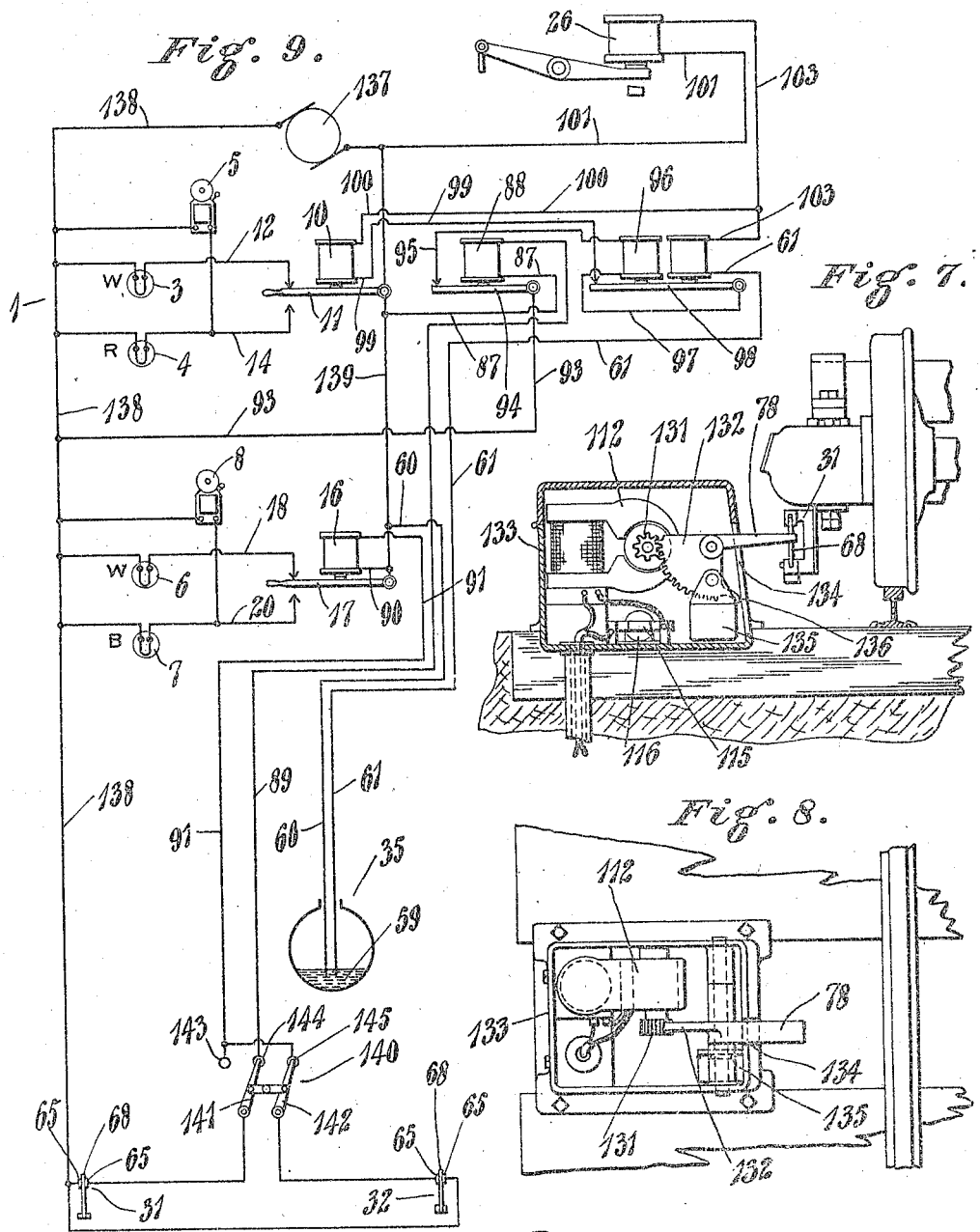

UNITED STATES PATENT OFFICE.

CHRISTIAN F. RUMOLD, OF BEREA, KENTUCKY.

RAILWAY SIGNAL AND CONTROL APPARATUS.

1,137,089.

Specification of Letters Patent.  Patented Apr. 27, 1915.

Application filed August 12, 1913. Serial No. 784,393.

*To all whom it may concern:*

Be it known that I, CHRISTIAN F. RU-MOLD, a citizen of the United States, residing at Berea, in the county of Madison and State of Kentucky, have invented certain new and useful Improvements in Railway Signal and Control Apparatus, of which the following is a specification.

My invention relates to signal apparatus and its object is to provide signals for and to control the running of railway vehicles.

My invention consists in the parts and in the details of construction and arrangement of parts as will hereinafter be more fully described and claimed.

In the drawing: Figure 1 is a diagram of the arrangement of my apparatus on a vehicle with batteries furnishing the current. Fig. 2 is a diagram of track signal apparatus suitable for use with my invention. Fig. 3 is a vertical longitudinal section through part of a vehicle truck illustrating in detail an arrangement of the mechanism forming part of my apparatus. Fig. 4 is a partial plan view of a circuit breaker. Fig. 5 is a side elevation of the same. Fig. 6 is an end elevation of the same. Fig. 7 is an end elevation of part of a vehicle truck and part of a track apparatus with the inclosing casing broken away to reveal the interior mechanism thereof, and showing how the track apparatus coöperates with the vehicle apparatus. Fig. 8 is a plan view of the track apparatus shown in Fig. 7 with the upper part of the casing removed. Fig. 9 is a diagram of my vehicle apparatus where a dynamo electric machine is the source of current.

As illustrated in Fig. 1 a combined visual and audible signal device 1 is provided to indicate conditions ahead of the vehicle in the direction in which it is traveling, and a similar apparatus 2 is provided to indicate conditions in the rear of the vehicle in the direction away from which the vehicle is traveling.

In the device 1, lamps 3 and 4, which may be white and red, respectively, as indicated by the initial letters, afford the visual signal and a bell 5 affords the audible signal. Similarly, in the device 2, lamps 6 and 7, which may be white and blue, respectively, as indicated by the initial letters, give the visual signal and the bell 8 gives the audible signal. In the device 1, a battery 9 supplies the current for either lamp and for the bell. A relay 10 attracts a contact bar 11 when energized and closes a circuit through the white lamp 3 by way of a conductor 12, battery 9 and a conductor 13. If the relay 10 is deënergized the bar 11 drops and breaks the above circuit but closes a circuit through the red lamp 4 by way of the conductor 14, battery 9 and the conductor 13. The bell 5 is connected parallel with the lamp 4 in this circuit. Thus, energizing the relay 10 lights the white lamp and leaves the red lamp dark and the bell 5 silent, but deënergization of the relay leaves the white lamp dark, displays the red light and rings the bell 5. The construction and operation of the device 2 is the same as that of the device 1, having a battery 15 and a relay 16 with a bar 17 closing circuit through the white lamp 6 by the way of conductor 18, the battery 15, and the conductor 19, or closing circuit through the blue lamp 7 by the way of the conductor 20, battery 15, and the conductor 19, accordingly as the relay 16 is energized or deënergized.

The above described devices 1 and 2 constitute the signal apparatus. To best insure safety it is desirable not only to give a signal but to automatically affect the operation of the vehicle. For this purpose the air-brake pipe 21 may have a chamber 22 continuous with its interior and normally closed by a valve 23 with a stem 24 connected to one end of a lever 25, the other end of which is attracted by an electric magnet 26 when the magnet is energized and thereby presses the valve 23 to its seat. A spring 27 is provided to raise the valve from its seat if the magnet 26 is deënergized. This movement of the lever 25 is limited by a stop 28. A whistle 29 forms the outlet from the space above the valve 23. When the valve is open the escape of air from the pipe 21 reduces the pressure in the pipe and causes the brakes to operate to stop or retard the vehicle and the escaping air also sounds an alarm or signal by means of the whistle 29.

The rectifying switch 30 is provided to interchange the connections to the relays 10 and 16 from the circuit breakers 31 and 32 carried down adjacent to the track bed, as by the truck 33. This rectifying switch 30 is actuated by a mechanism 34, driven in one direction or the other accordingly as the vehicle moves in one direction or the other.

To control the speed of the vehicle, a centrifugal circuit-breaker 35 is provided and driven along with the switch-actuating mechanism 34. The rectifying switch, as illustrated, comprises four bars 36, 37, 38 and 39 arranged parallel to each other, and pivoted at corresponding ends. They are also all pivoted to bar 40; and the lever 41, as here shown, engages with the bar 40 to move it and swing the bars 36, 37, 38 and 39 on their pivots. Five contact points 42, 43, 44, 45 and 46 are arranged in a series so that the free ends of the pivoted bars may swing over them and engage either as shown in the drawings with the points 42, 44, 43 and 45 respectively, or, when shifted through the medium of the lever 41 and the bar 40, to make contact with the points 46, 44, 42 and 43, respectively. The lever 41 has the rack bar 47 pivoted to it, with a short series of rack teeth 48 terminated in both directions by ratchet teeth 49. The rack teeth 48 will mesh with the teeth of a pinion 50, turned by a worm-gear 51 meshing with a worm 52 on a shaft with a gear 53, which gear has an idler gear 54 meshing with it and with the gear 55 on the axle of the truck 33. When the ratchet teeth 49 reach the teeth of the pinion, however, further longitudinal movement of the rack teeth 48 will cease and the ratchet teeth 49 will simply allow the teeth of the pinion 50 to slip under them due to inclined surfaces which they present toward the teeth, while the pinion is still rotating in that direction. As soon as the pinion starts to rotate in the other direction, however, one of its teeth will engage the side of the ratchet tooth 49 adjacent to the rack teeth 48, this side being abrupt, and the rack bar is again pulled down so that its rack teeth 48 mesh with the teeth of the pinion 50, moving longitudinally over until the ratchet tooth 49 at the other end engages with the teeth of the pinion, again stopping the shifting movement of the rack bar and acting as the ratchet tooth at the other end did during the rotation in the first direction. It is thus possible to secure a shifting of the bars of the rectifying switch 30 during the first motion of the vehicle in either direction automatically. A bevel gear 56 also turns along with the gear 53 as driven from the axle 55, and meshes with another bevel gear 57 with which the hollow body 58 of the centrifugal circuit breaker 35 rotates and contains a quantity of liquid electrical conducting material 59 such as mercury. Two conductors 60 and 61 extend down into the hollow body 58 and depend for connection together upon having their ends in contact with or immersed in the liquid conductor 59. The parts are so designed and the quantity of liquid is so proportioned that so long as the speed of the vehicle is within the proper bounds the liquid conductor 59 will make contact with and connect the ends of the conductors 60 and 61, but as soon as excessive speed is attained the liquid conductor 59 will, under the action of centrifugal force, spread outward and upward along the sides of the hollow body 58 and recede from the ends of the conductors 60 and 61, breaking the connection between them. The hollow body 58 is constructed so as to insulate the liquid conductor from the conductors 60 and 61, except at their terminal regions of contact or immersion, and the conducting parts should also be insulated from the supporting and driving mechanism.

The circuit breakers 31 and 32, mounted on the truck 53, are illustrated in enlarged detail in Figs. 4 to 6, inclusive. A bracket 62, constructed to bolt to some part of the truck frame or other convenient part of the vehicle, has an upper extension 63 which carries, in a downwardly opening recess 64, two tongues 65 on insulating mountings 66. Conductors are connected to these tongues 65 to lead to the other parts of the apparatus as will later be described. Preferably, the extension 63 is made hollow and the conductors lead through it over toward the part of the vehicle upon which the circuit-breaker is mounted. The bracket 62 has a lower extension 67 with an elongated transverse recess in which a blade 68 is pivoted on a bolt 69 passing back through the bracket 67. This blade 68, when in upright position, will come between the tongues 65 and make electrical connection between them through a contact plate 70 which it carries on its upper end on an insulating mounting 71. If the blade 68 be forced sidewise in either direction, turning on its pivot bolt 69, it will pass out from between the tongue 65 and break the electrical connection between the tongues. The upright position of the blade 68 is its normal position, and, to automatically return it from depressed position in either direction, a tension spring 72 engages in an eye 73 extending down from the hub of the blade 68 and engaging in an eye bolt 74 mounted in a stirrup 75 extending down from the extension 67. This eye bolt 74 is adjustable up and down in the stirrup 75 to adjust the tension of the spring 72. Buffers 76 are mounted in the extension 67, at the ends of the transverse recess therein, to receive the impact of the blade 68 as it is forced downward, and the impact is cushioned by having these buffers 76 mounted near opposite ends of the flat springs 77 which are supported in their middle parts in the extension 67 and flank the tension spring 72. With the blades 68 thus, or in any other suitable way, mounted to normally make a connection between the tongues 65, or be forced in either direction from between the tongues, and break the connection, any suitable projection properly placed along the track, such as the arm 78, will force from blade 68 back in direction opposite from that in which the vehicle is traveling, thus breaking the electrical connection as described.

In Fig. 5 the black arrow indicates the direction of travel of the vehicle and the white arrow indicates the direction of swinging of the blade 68 when engaged by the arm 78, as shown, said arm 78 being indicated in dotted lines only in Fig. 5 and also in Fig. 6.

Suitable mounting and controlling means for the arm 78 will be described, but it should be here noted that, with any arrangement, the circuit-breaker 31 at one side of the vehicle is to control signals from a direction along the track opposite to that of signals controlled by the other circuit breaker 32 on the other side of the vehicle. Thus, as shown in Fig. 1, the conductor 79 leads from one of the tongues 65 of the circuit-breaker 31 to the pivot of the bar 36 of the rectifying switch. Another conductor 80 leads from the other tongue of the circuit-breaker 31 to a battery 81, and a conductor 82 continues from the battery to the pivot of the bar 37 of the rectifying switch. A conductor 83 leads from one of the tongues 65 of the circuit-breaker 32 at the other side of the vehicle to the pivot of the bar 39 of the rectifying switch 30, and another conductor 84 leads from the other tongue 65 of the circuit breaker 32 to a battery 85, and from the battery a conductor 86 leads to the pivot of the bar 38 of the rectifying switch. The extreme outer points 45 and 46 are connected together and from them a conductor 87 leads to one end of the coil of a relay 88. The other end of the coil of this relay 88 is connected, through a conductor 89, to the middle point 44 of the rectifying switch. The two ends of the coil of the relay 16, which controls the signals in direction away from which the vehicle is running, are connected by conductors 90 and 91, respectively, to the points 42 and 43 of the rectifying switch 30.

From as much of the description as has been given it will be seen that either circuit-breaker 31 or 32 may have its tongues connected through the rectifying switch 30 with ends of the coil of either the relay 88 or the relay 16; and in each case a battery 81 or 85 respectively will be included in the circuit, energizing the relay that the battery is included with; but if the circuit breaker 31 is actuated to break the connection between its blades current will cease in the circuit and the relay be deënergized. Whichever circuit breaker is thus connected to the relay 16 will directly control the device 2 and indicate the conditions along the track in direction away from which the vehicle is running. Whichever circuit breaker is connected to the relay 88 will control, through additional apparatus to be described, the device 1, which indicates the conditions ahead of the vehicle in the direction in which it is traveling. This circuit-breaker will also control the action of the retarding or stopping mechanism by allowing the electromagnet 26 to be energized or deënergized. At the same time, in order to control the speed of the vehicle regardless of the signaling of the conditions ahead, the centrifugal circuit breaker, before described, is also made to affect the operation of the retarding or stopping device.

From the description of the circuit-breakers 31 and 32, it will be seen that the breakage of circuit is only momentary, since the blade 68 springs back and completes the electrical connection as soon as it has been disengaged by the arm 78. For that reason the contact bar 17 of the relay 16 is so arranged that the magnetism in the relay can not draw it back to make contact with the conductor 18, and it must be replaced manually as indicated by providing this contact bar with a handle. Arranged as described, this device 2 will simply continue to give the visual and audible signal of danger following the vehicle until the contact bar 17 is replaced by the operator of the vehicle. However, on account of the provision of the speed-control by the centrifugal circuit-breaker, in conjunction with the signaling device 1 and the retarding and stopping device, the conductors 87 and 89 are not directly connected with the relay 10 like the conductors 90 and 91 are directly connected to the relay 16, but are connected to the relay 88, as before described, so that they indirectly control the operation of the relay 10 of the device 1 which the relay forms a part of. Thus the relay 10 is energized by a battery 92 through a circuit by the way of a conductor 93, to the contact bar 94 of the relay 88 and conductor 95 with which the contact bar 94 makes contact when the relay 88 is energized, through the coil of electro-magnet 96, by the way of a conductor 97, through a contact bar 98 which is attracted by the electro-magnet 96, through a conductor 99 with which the contact bar 98 makes contact when held up by the electro-magnet 96, through the coil of the relay 10, by the way of the conductor 100, through the coil of the electro-magnet 26, and from there through the conductor 101 back to the battery 92. This circuit thus described will be broken indirectly by the breaking of contact in the circuit breaker 32 on account of the dropping of the contact bar 94 of the relay 88; or, if the rectifying switch 30 be reversed, breakage of contact in the circuit-breaker 31 will cause the relay 88 to be deënergized and drop the bar 94. When the current thus fails by the dropping of the bar 94, the relay 10 will also drop its bar 11, to remain thus dropped until manually replaced as before described.

The electro-magnet 96 is, of course, also deënergized by the failure of current in this circuit, but there is another electromagnet 102 which also attracts the contact bar 98 when energized. This other electro-magnet 102 is also energized by the battery 92. This magnet is in circuit with the battery 92 through the conductor 61, the liquid conductor 59 of the centrifugal circuit breaker, the conductor 60, the conductor 93, through the battery 92, by way of the conductor 101, through the coil of the electro-magnet 26, and by way of the conductor 103 back to the relay 102.

The speed of rotation of the hollow body 58 of the centrifugal circuit breaker being proportional to the speed of the vehicle, and with the proper design and proportion of parts as described, excessive speed of the vehicle will result in breakage of the circuit through the electro-magnet 102, by the withdrawal of the liquid conductor from the terminals of the conductors 60 and 61.

As before stated mere breakage of contact at the circuit-breaker 32 or 31, as the case may be, did not result in dropping of the bar 98, but if such occurred while the circuit was broken through the electro-magnet 102 by the centrifugal circuit-breaker, due to excessive speed of the vehicle, the contact bar 98 would drop when released by the electro-magnet 96. The electro-magnets 96 and 102 and the contact bar 98 which they both attract are so proportioned and arranged that the electro-magnet 96 cannot retract the bar 98 after it has dropped, but must await the action of the magnet 102 to regain the bar 98 in a position where it can hold it up. The electro-magnet 102 can raise the bar as soon as it is reënergized on any occasion. Therefore, droppage of this bar, due to concurrent excessive speed and danger ahead, will impair the circuit of the relay 10 until the speed is reduced to within the proper limits. Thus, it will not avail the operator of the vehicle to manually replace the contact bar 11 of the relay 10 in the signal device 1, so long as the excessive speed is maintained. But, when the speed has been reduced to the proper degree, the electro-magnet 102 will immediately pick up the bar 98 completing the circuit of the relay 10, since the relay 88 had already closed the circuit by its bar 94 on the return of the blade of the circuit-breaker 32 or 31, as the case may have been, and then when the bar 11 of relay 10 is manually raised it will be held in its raised position, causing the device 1 to again display its white light and indicate safety ahead. This bar 11, of course, would not properly be manually returned until all precaution had been taken by the operator in view of the danger ahead and the danger had been eliminated. Likewise since the circuit through the electro-magnet 26 had been completely broken, and not only contact had been broken in the centrifugal circuit breaker, but also between the bar 98 and the conductor 99, the stopping or slowing mechanism will continue to operate until the speed had been reduced within the proper bounds, upon which by the raising of the bar 98 by the magnet 102 the valve 23 will be immediately seated by the action of the electro-magnet 26 thus reënergized.

The rectifying switch 30 and the centrifugal circuit-breaker 35 may be mounted in a box 104 fixed to the truck beam 105, inside the truck, as shown in detail in Fig. 3, and the circuit-breakers 31 and 32 may be mounted on plates attached to the outer ends of the truck beam, as the plate 106, shown in Fig. 3. The conductors from the circuit breakers 31 and 32 may lead into the box 104 and the other conductors 60, 61, 87, 89, 90 and 91 may lead out of said box through a cable 107. The conductors may have any suitable location and may be provided individually for the various apparatus as indicated in Fig. 1, or a single set of batteries may be made to supply the current to the various apparatus connected in multiple. For example the truck indicated in Fig. 3 may be one of the trucks of the tender of a locomotive and the parts other than those indicated on the truck may be located in the cab of the locomotive. Also, a dynamo-electric machine may furnish the current for the apparatus connected in multiple as shown in Fig. 9, which will be later described.

A block system suitable for use in conjunction with the vehicle-carried apparatus is represented by the diagram in Fig. 2, where the rails 108 and 109 of the track are respectively divided into sections insulated from each other by insulators 110 and 111, so that blocks A, B, C, D, E, F, and G are defined. The illustration in the diagram is limited to showing how the block D is provided with apparatus for indicating a dangerous condition to a vehicle approaching the block or leaving it in either direction. It will be understood that all the other blocks of the track may be similarly provided with apparatus.

Provision is made so that a condition in block D will be signaled the length of two blocks away from block D, and also the length of one block away from the beginning thereof, in either direction. Thus, the signaling devices for block D in one direction are placed at the junction of block A with block B and at the junction of block B with block C on one side of the track, and, in the other direction, similar signaling devices are placed at the junction of block G with block F and at the junction of block F with block E on the other side of the track. Each signaling device as indicated on the one side of the track comprises a motor 112 and on the other side each device comprises a motor 113. These details are identical but numbered differently for convenience of reference. Each motor 112 or 113 is supplied with current from a battery 114 through a circuit which may be broken by the release of a bar 115 of a relay 116.

It will be understood that the rails 108 and 109 are not only insulated in sections but are insulated from each other across the track. This insulation may be afforded practically by the wooden cross ties or other non-conducting supports for the rails. Three relays 117, 118 and 119 are provided for the block D. The relays 117, and 118 are of relatively high resistance and the relay 119 is of relatively low resistance. The relays 116 that control the circuits of the motors 112 and 113 are all in series with a battery 120, and their circuit also is through the contact bars of the relays 118, 119 and 117. The contacts are so arranged that release of the bar of the relay 117 or the bar of the relay 118, by deënergization of the respective relay, will break the circuit; or so that attraction of the bar of the relay 119, by energization of this relay, will open the circuit and deënergize the relay 116, causing the current to fail through the motors 112 and 113. The coil of the relay 117 is in circuit with a battery 121 by way of a conductor 122, from it to the battery, and a conductor 123 to the extreme end of the block D in one direction, through the rail 108 to the extreme other end of the block D, and from there through the conductor 124 back to the relay 117. The relay 118 is in circuit with the battery 125 through a conductor 126, leading from it to the battery, through a conductor 127 to the extreme end of the block D in one direction, through the rail 109 to the extreme other end of the block D, and from there through a conductor 128 back to the relay 118. The coil of the relay 119 has its ends connected to the conductors 129 and 130 respectively. When either relay 117 or 118 is deënergized, the release of its bar will break the circuit through the relay 115 with the results before described. Also, if the rails 108 and 109 be connected, the circuit will be closed through both the batteries 121 and 125 and through the coil of the relay 119, bringing the batteries into series, and since the relay 119 is of relatively low resistance, it will receive enough current to attract its bar and break the circuit through the relays 116, even though the circuits through the other relays have not been impaired. The joining of the rails 108 and 109 will shunt the high resistance relays 117 and 118, thus causing each to also break the circuit of battery 120. Thus, any vehicle or other obstruction forming electrical connection between the rails 108 and 109 will cause a signal just as surely as will the breakage of either rail. By this means, any derangement of the track in block D, or any vehicle present therein, will be signaled at the ends of the other blocks by the action of the motors 112 and 113.

The mechanism to be operated by the motors 112 and 113 is shown in detail in Figs. 7 and 8. The motor shaft has a pinion 131 meshing with a segment gear 132 swinging on a horizontal axis in a suitable casing 133 that incloses the motor and the other parts. This segment gear 132 is provided with the arm 78, hereinbefore referred to, to engage with the blade 68 of the circuit-breaker 31 on the vehicle. The signal devices on the other side of the track represented in the diagram in Fig. 2 by the motor 113 would have their arms 78 engaged with the blade 68 of the circuit-breaker 32 on the other side of the vehicle, as indicated diagrammatically at the bottom of Fig. 1. The arm 78 projects through a slot 134 in the side of the casing 133. A counterweight 135 hangs on the segment 132, so that the segment is held down when there is no current through the motor and no torque on the motor shaft. As soon as the motor receives current it raises the segment and draws the arm 78 back through the slot 134 into the casing so that it cannot engage with the blades of the circuit-breakers on the vehicles. A lug 136 on the segment 132 engages with the pinion 131 and limits the upward travel of the segment, stopping the motor, but the motor continues to exert its torque and holds the segment up as long as the motor receives current, thereby indicating safe conditions in the block. Failure of the current will immediately permit the arm 68 to extend out and act to indicate danger to the approaching or departing vehicle.

Assuming the vehicle to be traveling from top to bottom of Fig. 2 toward block D, the presence of another vehicle in block D will be indicated by the action of the motors 112 engaging the arms 78 of their segments with the blade 68 of the circuit-breaker 31, which, in turn, will act on the device 1 on the vehicle. If the vehicle be traveling away from block D, toward the bottom of the figure, and another vehicle is following in block D, this will be indicated by the action of the motors 113 engaging the arms 78 of their segments with the blade 68 of the circuit-breaker 32, which will cause the device 2 to act.

As shown in Fig. 9, the generator 137 may be provided on the vehicle and connected to leads 138 and 139. To the lead 238 each of the lamps 3 and 4 and 6 and 7, of the devices 1 and 2, respectively, may have one of its terminals connected, while the other terminals of the respective lamps will have the conductors 12 and 14 and 18 and 20 for the contact bars 11 and 17 of the relays 10 and 16, respectively, to alternatively make contact with. The bells 5 and 8 will be connected in multiple with the lamps 4 and 7, respectively, in a manner similar to that illustrated in Fig. 1. The contact bars 11 and 17 are both connected to the other lead 139. The lead 138 connects to one tongue 65 of the circuit-breaker 31 and to one tongue 65 of the circuit-breaker 32. In this instance, a switch 140 is provided with two pivoted bars 141 and 142 and three contact points 143, 144 and 145. Bar 141 is connected to the other tongue 65 of the circuit-breaker 31 and the other bar 142 is connected to the remaining tongue 65 of the circuit-breaker 32. The contact point 144 is connected by a conductor 89 to one end of the coil of the relay 88, while the other end of this coil is connected by a conductor 87 to the lead 139. Thus, with the switch 140 thrown as shown in Fig. 9, the circuit-breaker 31 can make or break circuit through the relay 88 and generator 137. The contact points 145 and 143 are connected together and connected by a conductor 91 to one end of the coil of the relay 16, the other end of which coil is connected by the conductor 90 to the lead 139, so that, with the switch 140 thrown as shown, the circuit-breaker 32 can make or break circuit through the relay 16 and the generator 137. If the switch 140 be shifted, the circuit-breaker 32 will make or break circuit through the relay 88 and the generator and the other circuit-breaker will control the action of the relay 16. It will be understood that this switch may be automatically operated in accordance with the direction of movement of the vehicle in any suitable manner, or as in the manner hereinbefore described.

The relay 10 is in circuit with the generator 137 through the conductor 100 and conductor 103, the coil of the electro-magnet 26 and conductor 101, to the generator, then through the lead 138, the conductor 93, through the bar 94 of the relay 88, through the conductor 95 with which said bar makes contact, through the electro-magnet 96, the conductor 97 and the bar 98, and the conductor 99, back to the relay 10.

The electro-magnet 102 has one end of its coil connected to the conductor 103, the other end of the coil being connected to conductor 61 connecting with the liquid conductor 59 of the centrifugal circuit breaker. The other conductor 60 leads from the liquid conductor 59 and connects to the lead 139.

The operation of the apparatus will be the same as hereinbefore described. Such an arrangement is especially suitable for use on electric vehicles, where the current for the signal apparatus may be taken from the same source as that of the motive current; or on a locomotive where electric lighting is employed and a small generator is provided.

It will be understood that the centrifugal circuit-breaker may be dispensed with where it is not desired to control the speed of the vehicle otherwise than by depending upon the care of the operator. With the speed-controlling devices eliminated, the apparatus would be arranged so that opening of the circuit-breaker 31 or 32 would cause both the visual and audible signals and the stopping and retarding devices to operate on each occasion, regardless of the speed. The stopping and retarding device may also be eliminated, leaving only the signals to be controlled by the circuit-breakers, or the signals may be combined with the centrifugal circuit-breaker in such a way as to indicate excessive speed by the signals without relying on a stopping or retarding device.

From the foregoing it will be understood that my invention is capable of considerable modification without departing from the scope and spirit thereof, and therefore I do not wish to be understood as being limited to the precise illustration and description herein set forth as examples, but

What I claim as new and desire to secure by Letters Patent is:

1. In railway signal and control apparatus, in combination with a vehicle and engaging means along the path of travel of the vehicle, a signaling device on the vehicle, electro-magnetic means for controlling the signaling device by energization and deenergization of the means, said means being dependent upon manual return after deenergization, a bar in the circuit of said means, companion electro-magnetic means, either of which holds the bar in circuit-maintaining position when energized, the bar being released and breaking the circuit when both of said companion means are deenergized, the first one of said two means having a circuit through said bar and through the means that controls said signaling device and being unable to return said bar to circuit-maintaining position upon reenergization, but the second one of said two means being able to so return said bar when reënergized, a fourth single electro-magnetic means and a bar for said means also in the circuit of the first one of the two means to make or break the circuit, a source of current, means connecting this circuit with said source, means included in the circuit of the fourth electro-magnetic means adapted to be engaged by the means along the path of the vehicle to make or break said circuit, a circuit for the second one of said companion means, means connecting this circuit with a source of current, means in this circuit to make or break the circuit, actuated in accordance with the speed of travel of the vehicle, and electro-magnetic means affecting the mechanical operation of the vehicle by energization and deënergization of the means, included in the circuit which includes the means controlling the signaling device and the first one of said two means and the bar of said fourth means.

2. In railway signal and control apparatus, in combination with a vehicle and engaging means along the path of travel of the vehicle, signaling devices on the vehicle, separate electro-magnetic means for controlling the signaling devices by energization and deënergization of the means, said means being dependent upon manual return after deënergization, a bar in the circuit of one of said means, companion electro-magnetic means, either of which holds the bar in circuit maintaining position when energized, the bar being released and breaking the circuit when both of said companion means are deënergized, the first one of said companion means having a circuit through said bar and through the means that controls one of said signaling devices and being unable to return said bar to circuit-maintaining position upon reënergization, but the second one of said companion means being able to so return said bar when reënergized, a fourth single electro-magnetic means and a bar also in the circuit of the first one of said companion means to make or break the circuit, a source of current, means connecting this circuit with said source, and means in the circuit of the fourth electro-magnetic means adapted to be engaged by the means along the path of the vehicle to make or break said circuit, a circuit for the second one of said companion means, means connecting this circuit with a source of current, and means in this circuit to make or break the circuit, actuated in accordance with the speed of travel of the vehicle.

3. In railway signal and control apparatus, in combination with a vehicle and engaging means along the path of travel of the vehicle on both sides of the path, signaling devices on the vehicle, separate electro-magnetic means for controlling each signaling device by energization and deënergization of the means, said means being dependent upon manual return after deënergization, a bar in the circuit of said controlling means of one of said signaling devices, companion electro-magnetic means, either of which holds the bar in circuit-maintaining position when energized, the bar being released and breaking the circuit when both of said companion means are deënergized, the first one of said companion means having a circuit through said bar and through the means that controls said signaling device and being unable to return said bar to circuit-maintaining position upon reënergization, but the second one of said companion means being able to so return said bar when reënergized, a fourth single electro-magnetic means and a bar for said means also in the circuit of the first one of the companion means to make or break the circuit, means included in the circuit of the fourth electro-magnetic means adapted to be engaged by the means along one side of the path of the vehicle to make or break said circuit, a circuit for the second one of said companion means, means in this circuit to make or break the circuit, actuated in accordance with the speed of travel of the vehicle, a circuit for the controlling means of the other one of said signaling devices, means included in this circuit to be engaged by the means along the other side of the path of travel of the vehicle, and means supplying current to the respective circuits.

4. In railway signal and control apparatus, in combination with a vehicle and engaging means along the path of travel of the vehicle on both sides of the path, signaling devices on the vehicle, separate electro-magnetic means for controlling each signaling device by energization and deënergization of the means, said means being dependent upon manual return after deënergization, a bar in the circuit of said controlling means of one of said signaling devices, companion electro-magnetic means, either of which holds the bar in circuit-maintaining position when energized, the bar being released and breaking the circuit when both of said companion means are deënergized, the first one of said companion means having a circuit through said bar and through the means that controls said signaling device and being unable to return said bar to circuit-maintaining position upon reënergization, but the second one of said companion means being able to so return said bar when reënergized, a fourth single electro-magnetic means and a bar for said means also in the circuit of the first one of the companion means to make or break the circuit, means included in the circuit of the fourth electro-magnetic means adapted to be engaged by the means along one side of the path of the vehicle to make or break said circuit, a circuit for the second one of said companion means, means connecting this circuit with a source of current, means in this circuit to make or break the circuit, actuated in accordance with the speed of travel of the vehicle, and electro-magnetic means, affecting the mechanical operation of the vehicle by energization and deënergization of the means, included in the circuit which includes the controlling means of the first described signaling device and the first one of said companion means and the bar of said fourth means.

5. In railway signal and control apparatus, in combination with a vehicle, engaging means along the path of travel of the vehicle, signaling elements on the vehicle of different visual characteristics, electro-magnetic means rendering one or the other of said signaling elements active by energization or deënergization of the means, said means being dependent upon manual return after deënergization, a bar in the circuit of said means, companion electro-magnetic means, either of which holds the bar in circuit-maintaining position when energized, the bar being released and breaking the circuit when both of said companion means are deënergized, the first one of said companion means having a circuit through said bar and through the means that controls said signaling device and being unable to return said bar to circuit-maintaining position upon reënergization, but the second one of said companion means being able to so return said bar when reënergized, a fourth single electro-magnetic means and a bar therefor, also in the circuit of the first one of said companion means to make or break the circuit, a source of current, means connecting this circuit with said source, and means in the circuit of the fourth electro-magnetic means adapted to be engaged by the means along the path of the vehicle to make or break said circuit, a circuit for the second one of said companion means, means connecting this circuit with a source of current, and means in this circuit to make or break the circuit, actuated in accordance with the speed of travel of the vehicle.

6. In railway signal and control apparatus, in combination with a vehicle, engaging means along the path of travel of the vehicle, signaling elements on the vehicle of different visual characteristics, electro-magnetic means rendering one or the other of said signaling elements active by energization or deënergization of the means, said means being dependent upon manual return after deënergization, a bar in the circuit of said controlling means of one of said signaling devices, companion electro-magnetic means, either of which holds the bar in circuit-maintaining position when energized, the bar being released and breaking the circuit when both of said companion means are deënergized, the first one of said companion means having a circuit through said bar and through the means that controls said signaling device and being unable to return said bar to circuit-maintaining position upon reënergization, but the second one of said companion means being able to so return said bar when reënergized, a fourth single electro-magnetic means, and a bar for said means also in the circuit of the first one of the companion means to make or break the circuit, means included in the circuit of the fourth electro-magnetic means adapted to be engaged by the means along the path of the vehicle to make or break said circuit, a circuit for the second one of said companion means, means connecting this circuit with a source of current, means in this circuit to make or break the circuit, actuated in accordance with the speed of travel of the vehicle and electro-magnetic means, affecting the mechanical operation of the vehicle by energization and deënergization of the means, included in the circuit which includes the means controlling the signaling device, the first one of said companion means and the bar of said fourth means.

7. In railway signal and control apparatus, in combination with a vehicle, engaging means along the path of travel of the vehicle on both sides of said track, signaling devices on the vehicle each comprising signaling elements of different visual characteristics, separate electro-magnetic means for each signaling device rendering one or the other of said signaling elements active by energization or deënergization of the means, said means being dependent upon manual return after deënergization, a bar in the circuit of said controlling means on one of said signaling devices, companion electro-magnetic means, either of which holds the bar in circuit-maintaining position when energized, the bar being released and breaking the circuit when both of said companion means are deënergized, the first one of said companion means having a circuit through said bar and through the means that controls said signaling device and being unable to return said bar to circuit-maintaining position upon reënergization, but the second one of said companion means being able to so return said bar when reënergized, a fourth single electro-magnetic means and a bar for said means also in the circuit of the first one of the companion means to make or break the circuit, means included in the circuit of the fourth electro-magnetic means adapted to be engaged by the means along one side of the path of the vehicle to make or break said circuit, a circuit for the second one of said companion means, means in this circuit to make or break the circuit, actuated in accordance with the speed of travel of the vehicle, a circuit for the controlling means of the other one of said signaling devices, means included in this circuit to be engaged by the means along the other side of the path of travel of the vehicle, and means supplying current to the respective circuits.

8. In railway signal and control apparatus, in combination with a vehicle, engaging means along the path of travel of the vehicle on both sides of said track, signaling devices on the vehicle each comprising signaling elements of different visual characteristics, separate electro-magnetic means for each signaling device rendering one or the other of said signaling elements active by energization or deënergization of the means, said means being dependent upon manual return after deënergization, a bar in the circuit of said controlling means of one of said signaling devices, companion electro-magnetic means, either of which holds the bar in circuit-maintaining position when energized, the bar being released and breaking the circuit when both of said companion means are deënergized, the first one of said companion means having a circuit through said bar and through the means that controls said signaling device, and being unable to return said bar to circuit-maintaining position upon reënergization, but the second one of said companion means being able to so return said bar when reënergized, a fourth single electro-magnetic means and a bar for said means also in the circuit of the first one of the companion means to make or break the circuit, means included in the circuit of the fourth electro-magnetic means adapted to be engaged by the means along one side of the path of the vehicle to make or break said circuit, a circuit for the second one of said companion means, means connecting this circuit with a source of current, means in this circuit to make or break the circuit, actuated in accordance with the speed of travel of the vehicle, and electro-magnetic means, affecting the mechanical operation of the vehicle by energization and deënergization of the means, included in the circuit which includes the controlling means of the first described signaling device and the first one of said companion means and the bar of said fourth means.

CHRISTIAN F. RUMOLD.

Witnesses:
RALPH RIGBY,
GEO. G. DICK.